(12) United States Patent
Luo et al.

(10) Patent No.: US 11,400,773 B2
(45) Date of Patent: *Aug. 2, 2022

(54) TIRE PRESSURE SENSOR CAPABLE OF REPLACING A VALVE ASSEMBLY ACCORDING TO DIFFERENT USE REQUIREMENTS

(71) Applicant: AUTEL INTELLIGENT TECHNOLOGY CORP., LTD., Guangdong (CN)

(72) Inventors: Yongliang Luo, Guangdong (CN); Yunhui He, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,738

(22) Filed: Jun. 26, 2020

(65) Prior Publication Data
US 2020/0324589 A1 Oct. 15, 2020

Related U.S. Application Data

(63) Continuation of application No. PCT/CN2019/128647, filed on Dec. 26, 2019.

(30) Foreign Application Priority Data

Dec. 26, 2018 (CN) .......................... 201811600996.4

(51) Int. Cl.
*B60C 23/04* (2006.01)
*B60C 29/02* (2006.01)

(52) U.S. Cl.
CPC ...... *B60C 23/0494* (2013.01); *B60C 23/0408* (2013.01); *B60C 29/02* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

2008/0121031 A1  5/2008  Huang
2014/0311233 A1* 10/2014  Yu ....................... B60C 23/0494
                                            73/146.8

(Continued)

FOREIGN PATENT DOCUMENTS

CN         202062964 U    12/2011
CN         105150776 A    12/2015
(Continued)

OTHER PUBLICATIONS

Extended European Search Report dated Oct. 20, 2021; EP19880922.0.

*Primary Examiner* — Andre J Allen

(57) ABSTRACT

The present invention relates to the field of tire pressure detection technologies, and discloses a tire pressure sensor, including: a sensor assembly provided with a through hole; a valve assembly including a valve rod, a valve cover mounted to one end of the valve rod, a rod sleeve sleeved between two ends of the valve rod and a fastener connected to the other end of the valve rod through threads, one of the fastener and the valve rod passing through the through hole, and the fastener and the valve rod clamping the sensor assembly, where there are at least two sets of valve assemblies, the at least two sets of the valve assemblies being alternatively connected to the sensor assembly, a rod sleeve of one of the at least two sets of the valve assemblies being made of a metal material, and a rod sleeve of the other of the at least two sets of the valve assemblies being made of a rubber material. The at least two sets of valve assemblies with different specifications may alternately be connected to
(Continued)

the sensor assembly, and a user may mount, according to requirements, a valve assembly that meets the requirements.

18 Claims, 5 Drawing Sheets

(58) Field of Classification Search
CPC . B60C 23/0433; B60C 23/0493; B60C 19/00; B60C 23/04; B60C 23/0411; B60C 23/20; B60C 23/0444; B60C 23/0462; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/0372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/03; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8
See application file for complete search history.

(56) References Cited

U.S. PATENT DOCUMENTS

| | | | |
|---|---|---|---|
| 2014/0331759 A1* | 11/2014 | Chen ........................ | G01L 17/00 73/146.5 |
| 2015/0343861 A1* | 12/2015 | Gosi ..................... | B60C 29/005 137/227 |
| 2016/0167463 A1* | 6/2016 | Gout ................... | B60C 23/0498 73/146.3 |
| 2016/0178075 A1 | 6/2016 | Chen | |

FOREIGN PATENT DOCUMENTS

| | | |
|---|---|---|
| CN | 205615275 U | 10/2016 |
| CN | 106660415 A | 5/2017 |
| CN | 206277897 U | 6/2017 |
| CN | 206781450 U | 12/2017 |
| CN | 207106064 A | 3/2018 |
| CN | 109435592 A | 3/2019 |
| JP | 2009214833 A | 9/2009 |
| WO | 2010/114187 A1 | 10/2010 |
| WO | 2014108926 A1 | 7/2014 |

* cited by examiner

TIRE PRESSURE SENSOR CAPABLE OF REPLACING A VALVE ASSEMBLY ACCORDING TO DIFFERENT USE REQUIREMENTS

This application is a continuation application of International Application No. PCT/CN2019/128647, filed on Dec. 26, 2019, which claims priority of Chinese Patent Application No. 201811600996.4, filed on Dec. 26, 2018, which is incorporated herein by reference in its entirety

BACKGROUND

Technical Field

The present application relates to the field of tire pressure detection technologies, and in particular, to a tire pressure sensor.

Related Art

A pressure-sensor based tire pressure monitoring system is also referred to as a PSB TPMS. The PSB TPMS uses a tire pressure sensor installed on a tire to measure barometric pressure and temperature of the tire, uses a wireless transmitter to send pressure information from a tire interior to a tire pressure detection terminal, and displays barometric pressure data of the tire. When the tire is at high pressure, low pressure and high temperature, the system will alert the vehicle owner. In addition, the owner may set a tire pressure alarm value range and a temperature alarm value according to a vehicle type, car using habits and geographical location.

A traditional tire pressure sensor includes a sensor and a valve mounted to the sensor. The sensor is configured to detect tire information inside the tire, the valve is configured to inflate and deflate the tire. There are generally two types of valve, one is a metal valve, and the other is a rubber valve. Different vehicle models can only be applied to one of the two types.

However, in the process of implementing the present invention, the inventor finds that the current tire pressure sensor can only be provided with a single type of valve, and cannot be compatible with the metal valve and the rubber valve, limiting the application range of the tire pressure sensor. Therefore, the prior art needs to be improved.

SUMMARY

In order to resolve the foregoing technical problems, embodiments of the present invention provide a tire pressure sensor capable of replacing a valve assembly according to different use requirements.

In order to resolve the foregoing technical problem, the embodiments of the present invention provide the following technical solutions.

A tire pressure sensor is provided, including: a sensor assembly provided with a through hole; a valve assembly including a valve rod, a valve cover mounted to one end of the valve rod, a rod sleeve sleeved between two ends of the valve rod and a fastener connected to the other end of the valve rod through threads, one of the fastener and the valve rod passing through the through hole, and the fastener and the valve rod clamping the sensor assembly, where there are at least two sets of valve assemblies, the at least two sets of the valve assemblies being alternatively connected to the sensor assembly, a rod sleeve of one of the at least two sets of the valve assemblies being made of a metal material, and a rod sleeve of the other of the at least two sets of the valve assemblies being made of a rubber material.

In some embodiments, the sensor assembly includes a base and a mounting stand connected to the base, the base being configured to fit a rim, and the mounting stand being provided with the through hole.

In some embodiments, the mounting stand is provided with a groove, the through hole being in communication with the groove, and the valve assembly being inserted into the groove.

In some embodiments, the mounting stand includes a first surface and a second surface opposite to each other; the groove being disposed on the first surface, and the groove including a groove bottom, the groove bottom being provided with the through hole penetrating through the second surface; the valve assembly further includes a fastener, and the valve rod is further provided with a connecting portion; the valve rod abutting against the groove bottom, the connecting portion passing through the through hole away from one end of the valve rod and being connected to the fastener through threads, and the fastener abutting against the second surface.

In some embodiments, the mounting stand includes a first surface and a second surface opposite to each other; the groove being disposed on the first surface, and the groove including a groove bottom, the groove bottom being provided with the through hole penetrating through the second surface; the valve assembly further includes a fastener, the fastener including a limiting portion and a connecting portion connected to the limiting portion; the limiting portion abutting against the second surface, one end of the connecting portion far from the limiting portion passing through the through hole and being connected to the valve rod through threads, and the valve rod abutting against the groove bottom.

In some embodiments, the valve rod is provided with a screw hole aligned with the through hole, the connecting portion being connected to the screw hole through threads.

In some embodiments, the second surface is provided with a strengthened piece, the strengthened piece abutting between the limiting portion and the second surface.

In some embodiments, the mounting stand further includes a third surface connected between the first surface and the second surface, the third surface being provided with a slot; a connecting piece that is attached to the third surface extending from the strengthened piece, and a holding piece that is inserted into the slot extending from the connecting piece.

In some embodiments, the holding piece is provided with a barb, the barb abutting against a side wall of the slot.

In some embodiments, the groove bottom is spherical, and the valve rod may rotate along the groove bottom.

In some embodiments, the valve rod includes a mounting portion, one end of the mounting portion being hemispherical and abutting against the groove bottom.

In some embodiments, the groove further includes a first limiting surface connected to the groove bottom; and a second limiting surface is provided between two ends of the mounting portion; the groove being provided with the second limiting surface, and the first limiting surface abutting against the second limiting surface, so that the valve rod may rotate relative to the sensor assembly about a preset axis, the preset axis being normal to the first limiting surface or the second limiting surface.

In some embodiments, the through hole is a waist-shaped hole, the waist-shaped hole being normal to the preset axis in a length direction.

In some embodiments, the second surface has a same radian as the groove bottom.

In some embodiments, the base includes a case bottom and an upper case, the upper case and the case bottom being connected by laser welding, and the case bottom and the upper case forming a cavity, the cavity being configured to mount a circuit board, a battery and an antenna, the circuit board, the battery and the antenna forming a transmitting board.

In some embodiments, the valve rod includes a central axis, the central axis passing through the center of gravity of the sensor assembly.

In some embodiments, the sensor assembly includes two opposite sides, one side being provided with a battery, the central axis being located between the two sides of the sensor assembly, and the central axis being closer to the side that is of the sensor assembly and that is provided with the battery.

In some embodiments, the rod sleeve made of metal includes a valve seal ring, a nut gasket and a nut, the valve seal ring, the nut gasket and the nut being sequentially sleeved on the valve rod, and among the valve seal ring, the nut gasket and the nut, the nut being closer to the valve cover.

In comparison to the prior art, the tire pressure sensor in the embodiments of the present invention includes: a sensor assembly provided with a through hole; a valve assembly including a valve rod, a valve cover mounted to one end of the valve rod, a rod sleeve sleeved between two ends of the valve rod, and a fastener connected to the other end of the valve rod through threads, one of the fastener and the valve rod passing through the through hole, and the fastener and the valve rod clamping the sensor assembly, where there are at least two sets of valve assemblies, the at least two sets of the valve assemblies being alternatively connected to the sensor assembly, a rod sleeve of one of the at least two sets of the valve assemblies being made of a metal material, and a rod sleeve of the other of the at least two sets of the valve assemblies being made of a rubber material. The at least two sets of valve assemblies with different specifications are disposed, which may alternately be connected to the sensor assembly, and a user may mount, according to requirements, a valve assembly that meets the requirements.

BRIEF DESCRIPTION OF THE DRAWINGS

One or more embodiments are described by way of example with reference to the corresponding accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding this application, this application is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "perpendicular", "horizontal", "left", and "right" and similar expressions used in this specification are merely used for the purpose of description.

Unless otherwise defined, meanings of all technical and scientific terms used in this specification are the same as that usually understood by persons skilled in the technical field to which this application belongs. In this specification, terms used in the specification of the present disclosure are merely intended to describe objectives of the specific embodiments, but are not intended to limit the present disclosure. A term "and/or" used in this specification includes any or all combinations of one or more related listed items.

Figure 1:
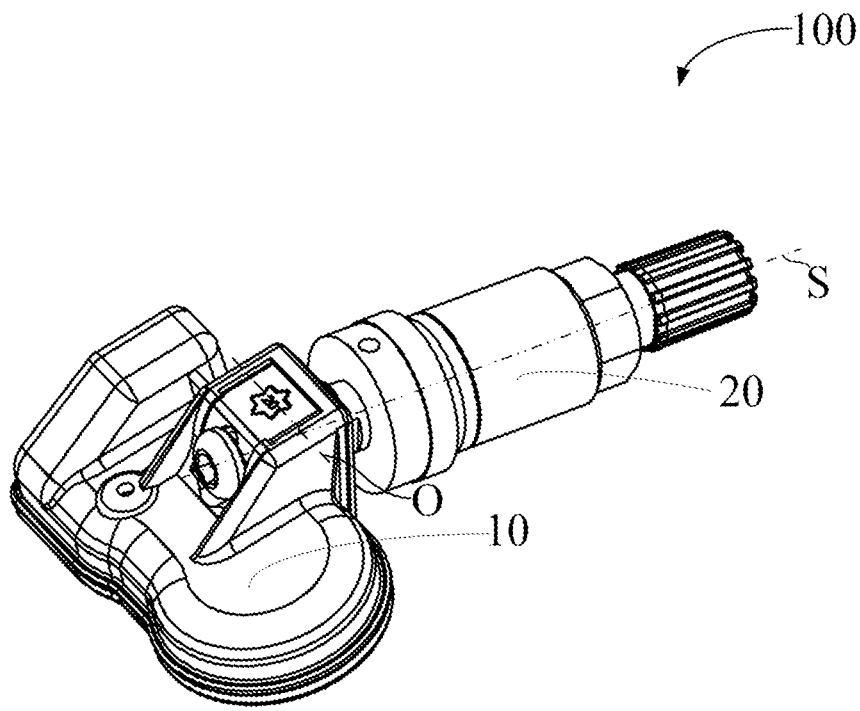
FIG. 1 is a schematic structural diagram of a tire pressure sensor according to an embodiment of the present invention.
Figure 2:
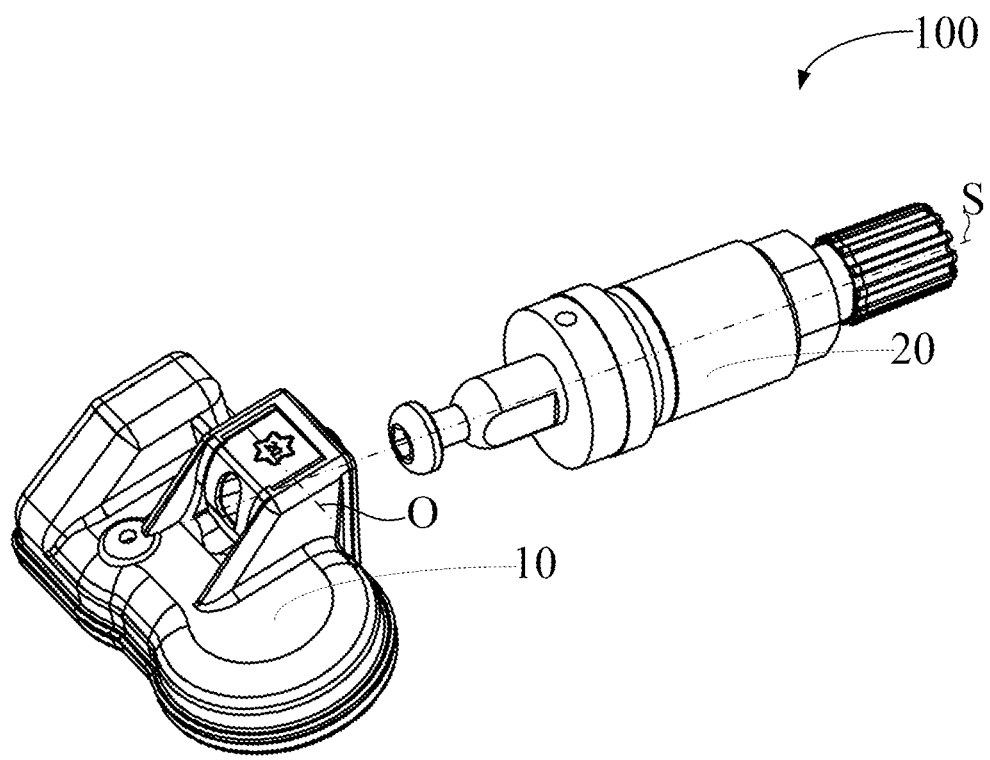
FIG. 2 is a schematic disassembly diagram of the tire pressure sensor shown in FIG. 1.

Referring to FIG. 1 and FIG. 2, an embodiment of the present invention provides a tire pressure sensor 100. The tire pressure sensor 100 includes a sensor assembly 10 and at least two sets of valve assemblies 20 with different specifications. The at least two sets of valve assemblies 20 with different specifications may alternately be connected to the sensor assembly 10.

Figure 3:
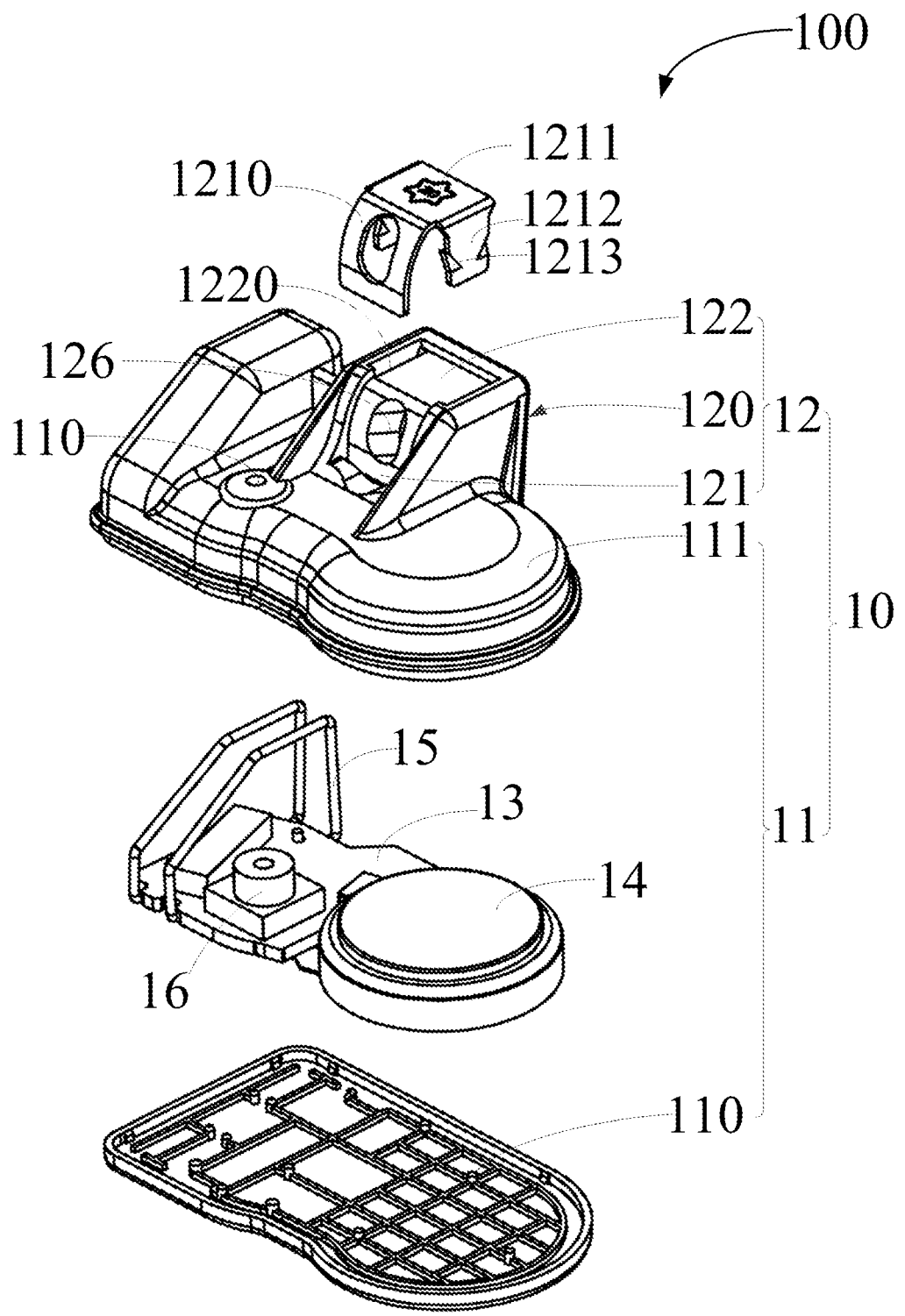
FIG. 3 is a schematic disassembly diagram of a sensor assembly of the tire pressure sensor shown in FIG. 2.

Referring to FIG. 3 together, the sensor assembly 10 includes a base 11 and a mounting stand 12 connected to the base 12.

The base 11 may be made of a plastic material, and the base 11 is provided with a cavity. Components such as a circuit board 13, a battery 14, and an antenna 15 are mounted in the cavity. The circuit board 13 carries a chip set, for example, a wireless transmission chip and a pressure detection chip. The pressure detection chip is provided with an air pressure detection hole and is configured to detect air pressure in the air pressure detection hole. The wireless transmission chip is connected to the antenna 15 and is configured to be wirelessly connected to a tire pressure monitoring terminal located on an automobile dashboard. The battery 14 is a button battery, the battery 14 and the antenna 15 are connected to the circuit board 13 by soldering, and the battery 14, the antenna 15 and the circuit board 13 form a transmitting board.

The base 11 includes a case bottom 110 and an upper case 111 connected to the case bottom 110, the upper case 111 being connected to the case bottom 110 to form the cavity.

The case bottom 110 may be made of a light-transmissive material, and a surface that is of the case bottom 110 and that faces away from the upper case 111 is configured to fit a rim of a tire.

The upper case 111 may be made of a dark opaque material. A surface that is of the upper case 111 and that faces away from the case bottom 110 is provided with an air hole 1110, the air hole 1110 being aligned with the air pressure detection hole. Preferably, the air hole 1110 and the air pressure detection hole are sealed using a seal ring 16.

In the present embodiment, the upper case 111 and the case bottom 110 are connected through laser welding.

In some other embodiments, the upper case 111 and the case bottom 110 are connected through potting.

It should be noted that, in comparison to the way of potting, the cavity formed by the upper case 111 and the case bottom 110 through laser welding may have good gas tightness. In addition, the upper case 111 and the case bottom 110 have high assembly efficiency, and the damage of the colloid to the human body and the pollution to the environment are reduced.

Figure 4:
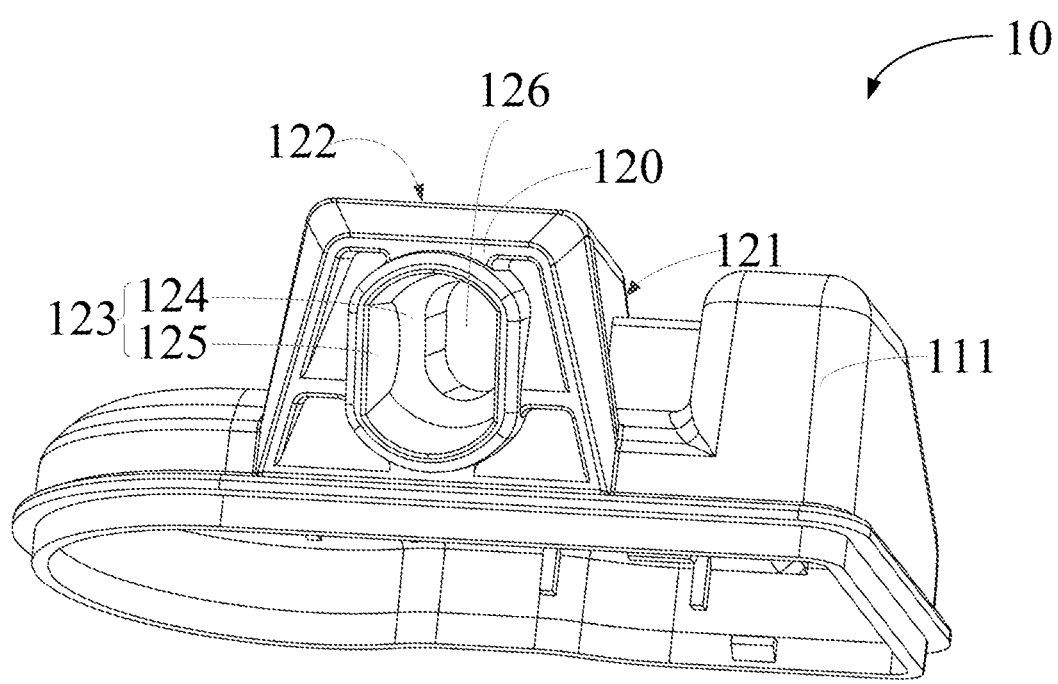
FIG. 4 is a schematic structural diagram of an upper case and a mounting stand of the sensor assembly shown in FIG. 3.

Referring to FIG. 4 together, the mounting stand 12 is disposed on a surface that is of the upper case 111 and that is far away from the case bottom 110. The mounting stand 12 includes a first surface 120, a second surface 121 and a third surface 122. The first surface 120 and the second surface 121 are both vertically disposed relative to the case bottom 110, and the third surface 122 is connected between the first surface 120 and the second surface 121. Preferably, the third surface 122 is disposed away from the case bottom 110.

The first surface 120 is provided with a groove 123, the groove 123 including a groove bottom 124 and a first limiting surface 125 connected to the groove bottom 124.

The groove bottom 124 is a curved surface. Preferably, the groove bottom 124 is a spherical surface. The groove bottom 124 is provided with a through hole 126 penetrating through the groove bottom 124 and the second surface 121, that is, the through hole 126 is in communication with the groove 123. Preferably, the through hole 126 is a waist-shaped hole, the waist-shaped hole 126 being vertically disposed relative to the shell bottom 110 in a length direction.

The two first limiting surfaces 125 are disposed opposite to each other, and the two first limiting surfaces 125 are vertically disposed relative to the case bottom 110. Preferably, the first limiting surface 125 is a plane, and two curved surfaces disposed opposite to each other are connected between the two first limiting surfaces 125.

The second surface 121 is provided with a strengthened piece 1210. The strengthened piece 1210 may be made of a material such as stainless steel or manganese steel with higher strength, and the through hole 126 penetrates through the strengthened piece 1210. A connecting piece 1211 extends from the strengthened piece 1210, the connecting piece 1211 being attached to the third surface 122, and a holding piece 1212 extending from the connecting piece 1211 toward a direction of the third surface 122. Preferably, the holding piece 1212 is provided with a barb 1213.

The third surface 122 is provided with a slot 1220 for inserting the holding piece 1212. The holding piece 1212 is inserted into the slot 1220, and the barb 1213 abuts against a side wall of the slot 1220.

A maximum distance between the case bottom 110 and the mounting stand 12 does not exceed a preset distance, so that the sensor assembly 10 can fit the rim of the tire better, to prevent the tire pressure sensor 100 from suspending during assembling and disassembling of the tire, so that the sensor assembly 20 is not easily damaged.

Figure 5:
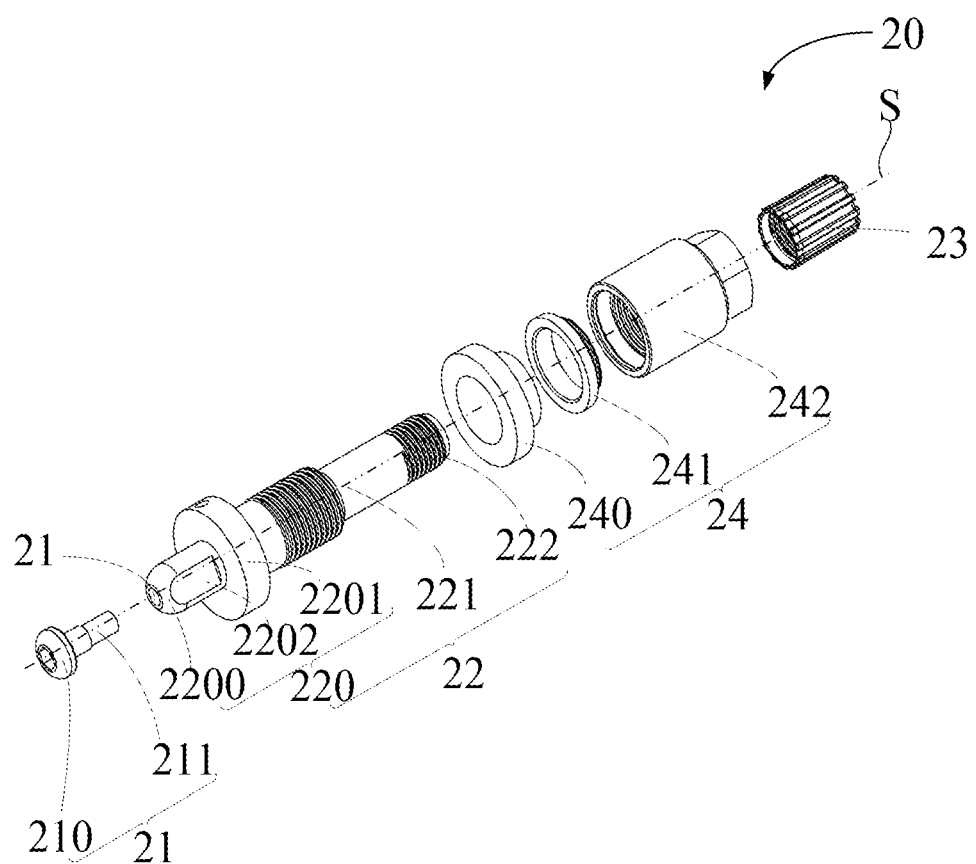
FIG. 5 is a schematic disassembly diagram of a valve assembly of the tire pressure sensor shown in FIG. 2.
Figure 6:
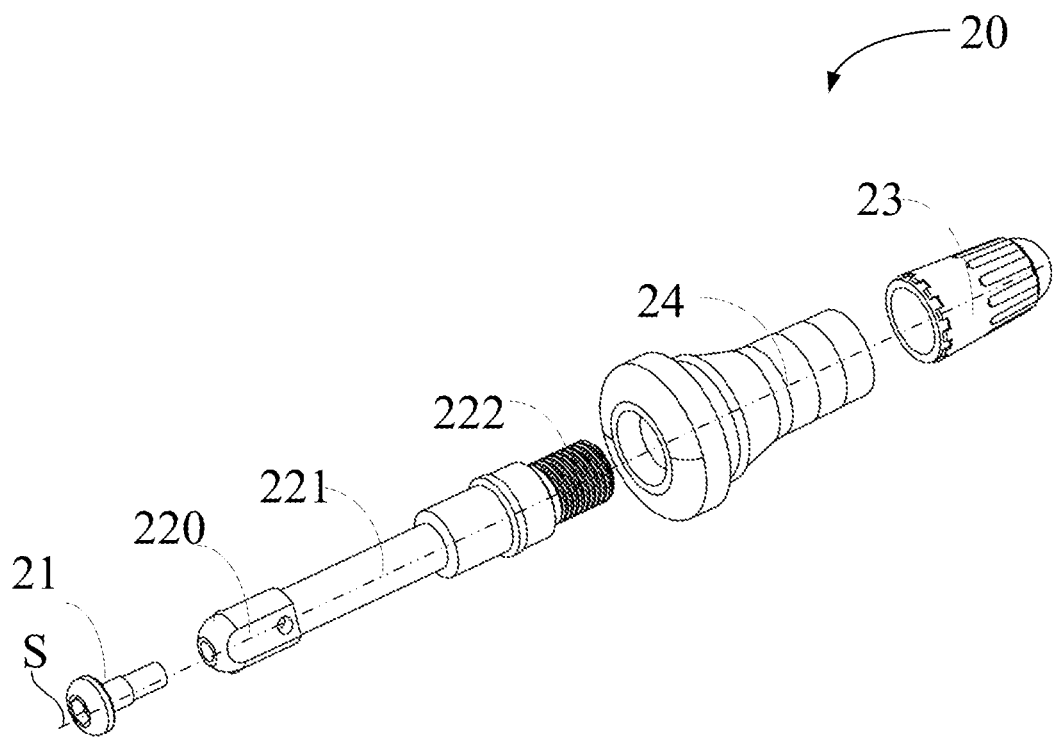
FIG. 6 is a schematic disassembly diagram of a valve assembly with another specification of the tire pressure sensor shown in FIG. 2.
Figure 7:
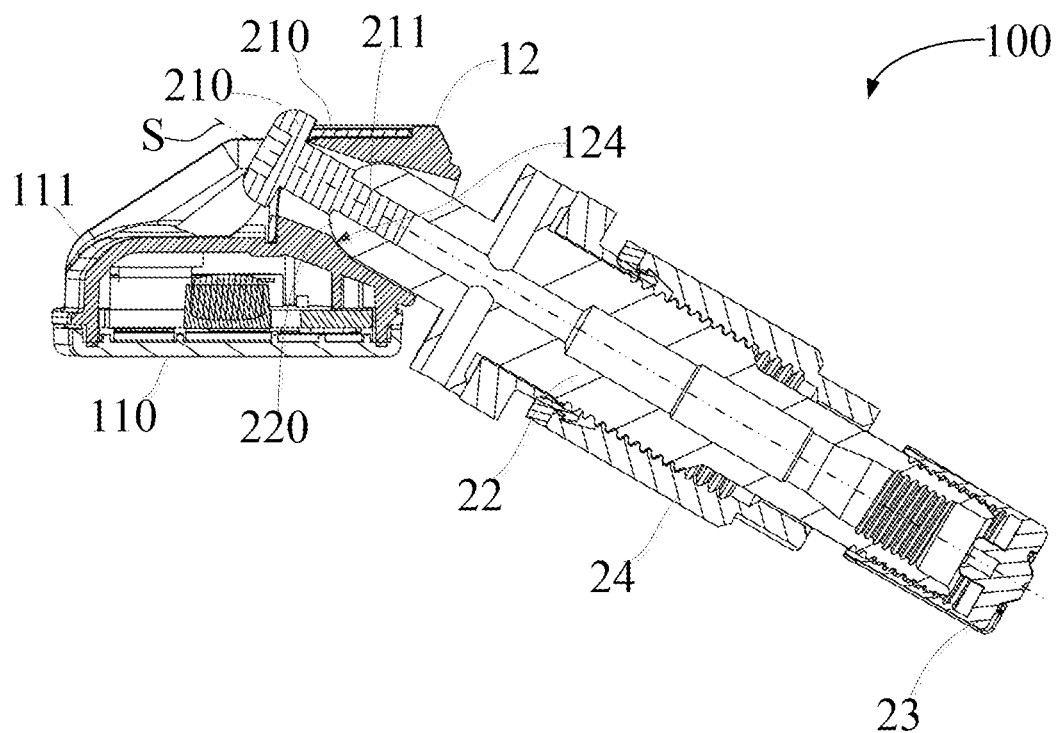
FIG. 7 is a schematic diagram of an inner structure of the tire pressure sensor shown in FIG. 1.

Referring to FIG. 5 to FIG. 7 together, each set of the valve assemblies 20 is detachably connected to the sensor assembly 10.

Each set of the valve assemblies (20) includes a fastener 21, a valve rod 22, a valve cover 23 and a rod sleeve 24. The fastener 21 is detachably connected to one end of the valve rod 22, the valve cover 23 is mounted to the other end that is of the valve rod 22 and that faces away from the fastener 21, and the rod sleeve 24 is sleeved between the two ends of the valve rod 22.

The fastener 21 passes through the through hole 126, and the fastener 21 is connected to the valve rod 22 through threads. The fastener 21 and the valve rod 22 clamp the sensor assembly 10.

The fastener 21 includes a limiting portion 210 and a connecting portion 211 connected to the limiting portion 210. One end that is of the connecting portion 211 and that faces away from the limiting portion 210 passes through the through hole 126 and is connected to the valve rod 22 through threads. The limiting portion 210 abuts against a surface that is of the strengthened piece 1210 and that faces away from the second surface 121, and the valve rod 22 abuts against the groove bottom 124.

In some other embodiments, the valve rod 22 is provided with a connecting portion 211, and the connecting portion is provided at one end facing away from the valve cover 23. The valve rod 22 abuts against the groove bottom 124, and one end that is of the connecting portion 211 and that faces away from the valve rod 22 passes through the through hole 126 and is connected to the fastener 21 through threads, and the fastener 21 abuts against a surface that is of the strengthened piece 1210 and that faces away from the second surface 121. Therefore, one end of the fastener 21 and the valve rod 22 passes through the through hole 126.

The valve rod 22 may be made of metal such as copper. The valve rod 22 includes a mounting portion 220, a rod portion 221 connected to the mounting portion 220 and a mouth portion 222 connected to the rod portion 221. The valve rod 22 is provided with a gas path, the gas path passing through the mounting portion 220, the rod portion 221 and the mouth portion 222, and a valve core being provided in the gas path.

The mouth portion 222 is detachably connected to the valve cover 23. Preferably, the mouth portion 222 is connected to the valve cover 23 through threads, and the valve cover 23 is configured to close the gas path.

The rod portion 221 is sleeved with the rod sleeve 24.

In the present embodiment, as shown in FIG. 5, a rod sleeve 24 of one of the at least two sets of valve assemblies 20 includes a valve seal ring 240, a nut gasket 241 and a nut 242. The valve seal ring 240, the nut gasket 241 and the nut 242 are all made of metal, the valve seal ring 240, the nut gasket 241 and the nut 242 are sleeved on the rod portion 221 in sequence, and among the valve seal ring 240, the nut gasket 241 and the nut 242, the nut 242 is closer to the valve cover 23.

In the present embodiment, as shown in FIG. 6, a rod sleeve 24 of the other of the at least two sets of valve assemblies 20 is made of a rubber material.

The mounting portion 220 is a column as a whole. The mounting portion 220 includes a front end 2200, a rear end 2201 and a second limiting surface 2202 located between the front end 2200 and the rear end 2201.

The rear end 2201 of the mounting portion 220 is connected to the rod portion 221.

The front end 2200 of the mounting portion 220 is hemispherical, and the front end 2200 is provided with a screw hole 2203 aligned with the through hole 126. The connecting portion 211 of the fastener 21 is connected to the screw hole 2203 through threads.

The second limiting surface 2202 is a plane, and the two second limiting surfaces 2202 abut against a corresponding first limiting surface 125, respectively. The first limiting surface 125 is matched with the second limiting surface 2202 to limit the valve assembly 20, so that the valve assembly 20 may rotate around a preset axis O with respect to the sensor assembly 10. Preferably, the preset axis O is normal to the first limiting surface 125 or the second limiting surface 2202. When mounted to a rim with a special specification, the valve assembly 20 may rotate relative to the sensor assembly 10 about the preset axis O, so that the sensor assembly 10 and the rim fit together, preventing breakage between the base 11 and the mounting stand 12 during disassembling or assembling of the tire pressure sensor 100 as a result of suspension of the sensor assembly 10.

The valve rod 22 has a central axis S, and the central axis S passes through the center of gravity of the sensor assembly 10, so that after the tire pressure sensor 100 is mounted to the rim, influence on the dynamic balance performance of the tire is reduced. The overall weight of the sensor assembly 10 is relatively light. Generally, the total mass of the base 11 and the mounting stand 12 does not exceed 11 grams, and there are following two methods for adjusting the center of gravity of the sensor assembly 10.

Method I: A straight line on which the center of gravity is located is found according to weight distribution at both sides of the sensor assembly 10, and then the sensor assembly 10 is provided with a groove 123, the groove 123 being located on the straight line on which the center of gravity of the sensor assembly 10 is located, that is, on the central axis S. Since the battery 14 in the sensor assembly 10 is relatively heavy, the central axis S is closer to the side that is of the sensor assembly 10 and that is provided with the battery 14, that is, the central axis S is not a symmetry axis of the sensor assembly 10.

Method II: When the tire pressure sensor 100 is actually applied, the groove 123 may also be directly provided on the symmetry axis of the sensor assembly 10. Since the battery 14 is relatively heavy, weight is added to the opposite side of the sensor assembly 10 and the battery 14, so that the center of gravity of the sensor assembly 10 is located on the symmetry axis of the sensor assembly 10. However, due to the added weight, the influence on dynamic balance of the tire is also increased.

Based on the above, at the two opposite sides of the sensor assembly 10, a battery 14 is disposed on one of the two sides, the central axis S is located between the two sides of the sensor assembly 10, and the central axis S is closer to the side that is of the sensor assembly 10 and that is provided with the battery 14.

It should be noted that, the tire pressure sensor 100 is adjusted to adjust the dynamic balance performance, that is, the center of gravity of the sensor assembly 10 is adjusted. During high-speed driving, the risk of one side of the sensor component 10 being lifted up may be avoided as a result of different centrifugal forces on both sides of the sensor assembly 10, which may seriously cause the software function to fail, or the breakage of the sensor assembly 10 during disassembly may be avoided.

When the tire pressure sensor 100 is specifically used, in the first step, the user selects an appropriate valve assembly according to the model of the car; in the second step, the mounting portion 220 of the valve rod 22 is inserted into the groove 123, the connecting portion 210 of the fastener 21 passes through the through hole 126 and is connected to the mounting portion 220 through threads; in the third step, the user may adjust an angle between the sensor assembly 10 and the valve assembly 20 according to the specifications of the rim, so that the case bottom 110 of the sensor assembly 10 fits the rim; in the fourth step, the valve rod 22 is inserted into the rim from one end of the mouth portion 222; and in the last step, the rod sleeve 24 is sleeved on the rod portion 221 of the valve rod 22 from one end of the mouth portion 222.

In comparison to the prior art, the tire pressure sensor 100 of the embodiments of the present invention includes at least two sets of valve assemblies 20 with different specifications, which may alternately be connected to the sensor assembly 10, and a user may mount, according to requirements, the valve assembly 20 that meets the requirements.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A tire pressure sensor (100), comprising:
a sensor assembly (10) provided with a through hole (126);
a valve assembly (20) comprising a valve rod (22), a valve cover (23) mounted to one end of the valve rod (22), a rod sleeve (24) sleeved between two ends of the valve rod (22) and a fastener (21) connected to the other end of the valve rod (22) through threads, one of the fastener (21) and the valve rod (22) passing through the through hole (126), and the fastener (21) and the valve rod (22) clamping the sensor assembly (10);
the valve assembly (20) rotatable relative to the sensor assembly (10), wherein
there are at least two sets of the valve assemblies (20), the at least two sets of the valve assemblies (20) being alternatively connected to the sensor assembly (10), a rod sleeve (24) of one of the at least two sets of the valve assemblies (20) being made of a metal material, and a rod sleeve (24) of the other of the at least two sets of the valve assemblies (20) being made of a rubber material.

2. The tire pressure sensor (100) according to claim 1, wherein the sensor assembly (10) comprises a base (11) and a mounting stand (12) connected to the base (11), the base (11) being configured to fit a rim, and the mounting stand (12) being provided with the through hole (126).

3. The tire pressure sensor (100) according to claim 2, wherein the mounting stand (12) is provided with a groove (123), the through hole (126) being in communication with the groove (123), and the valve assembly (20) being inserted into the groove (123).

4. The tire pressure sensor (100) according to claim 3, wherein the mounting stand (12) comprises a first surface (120) and a second surface (121) that are disposed opposite to each other;
the groove (123) being provided on the first surface (120), and the groove (123) comprising a groove bottom (124), the groove bottom (124) being provided with the through hole (126) penetrating through the second surface (121);

the valve assembly (20) further comprises a fastener (21), and the valve rod (22) is provided with a connecting portion (211);

the valve rod (22) abutting against the groove bottom (124), one end that is of the connecting portion (211) and that faces away from the valve rod (22) passing through the through hole (126) and being connected to the fastener (21) through threads, and the fastener (21) abutting against the second surface (121).

5. The tire pressure sensor (100) according to claim 3, wherein the mounting stand (12) comprises a first surface (120) and a second surface (121) that are disposed opposite to each other;

the groove (123) being provided on the first surface (120), and the groove (123) comprising a groove bottom (124), the groove bottom (124) being provided with the through hole (126) penetrating through the second surface (121);

the valve assembly (20) further comprises a fastener (21), the fastener (21) comprising a limiting portion (210) and a connecting portion (211) connected to the limiting portion (210);

the limiting portion (210) abutting against the second surface (121), and one end that is of the connecting portion (211) and that is away from the limiting portion (210) passing through the through hole (126) and being connected to the valve rod (22) through threads, and the valve rod (22) abutting against the groove bottom (124).

6. The tire pressure sensor (100) according to claim 5, wherein the valve rod (22) is provided with a screw hole (2203) aligned with the through hole (126), the connecting portion (211) being connected to the screw hole (2203) through threads.

7. The tire pressure sensor (100) according to claim 4, wherein the second surface (121) is provided with a strengthened piece (1210), the strengthened piece (1210) abutting between the limiting portion (210) and the second surface (121).

8. The tire pressure sensor according to claim 7, wherein the mounting stand (12) further comprises a third surface (122) connected between the first surface (120) and the second surface (121), the third surface (122) being provided with a slot (1220);

a connecting piece (1211) that is attached to the third surface (122) extending from the strengthened piece (1210), a holding piece (1212) that is inserted into the slot (1220) extending from the connecting piece (1211).

9. The tire pressure sensor (100) according to claim 8, wherein the holding piece (1212) is provided with a barb (1213), the barb (1213) abutting against a side wall of the slot (1220).

10. The tire pressure sensor (100) according to claim 4, wherein the groove bottom (124) is a curved surface, and the valve rod (22) may rotate along the groove bottom (124).

11. The tire pressure sensor (100) according to claim 10, wherein the valve rod (22) comprises a mounting portion (220), one end of the mounting portion (220) being hemispherical and abutting against the groove bottom (124).

12. The tire pressure sensor (100) according to claim 10, wherein the groove (123) further comprises a first limiting surface (125) connected to the groove bottom (124); and a second limiting surface (2202) is provided between two ends of the mounting portion (220);

the groove (123) being provided with the second limiting surface (2202), and the first limiting surface (125) abutting against the second limiting surface (2202), so that the valve rod (22) may rotate relative to the sensor assembly (10) about a preset axis (O), the preset axis (O) being normal to the first limiting surface (125) or the second limiting surface (2202).

13. The tire pressure sensor (100) according to claim 12, wherein the through hole (126) is a waist-shaped hole, the waist-shaped hole being normal to the preset axis (O) in a length direction.

14. The tire pressure sensor (100) according to claim 10, wherein the second surface (121) has a same radian as the groove bottom (124).

15. The tire pressure sensor (100) according to claim 1, wherein the base (11) comprises a case bottom (110) and an upper case (111), the upper case (111) and the case bottom (110) being connected by laser welding, and the case bottom (110) and the upper case (111) forming a cavity;

the cavity being configured to mount a circuit board (13), a battery (14) and an antenna (15), the circuit board (13), the battery (14) and the antenna (15) forming a transmitting board.

16. The tire pressure sensor (100) according to claim 1, wherein the valve rod (22) comprises a central axis (S), the central axis (S) passing through the center of gravity of the sensor assembly (10).

17. The tire pressure sensor (100) according to claim 16, wherein one side of two opposite sides of the sensor assembly (10) being provided with a battery (14), the central axis (S) being located between the two sides of the sensor assembly (10), and the central axis (S) being closer to the side that is of the sensor assembly (10) and that is provided with the battery (14).

18. The tire pressure sensor (100) according to claim 1, wherein the rod sleeve (24) made of metal comprises a valve seal ring (240), a nut gasket (241) and a nut (242), the valve seal ring (240), the nut gasket (241) and the nut (242) being sleeved on the valve rod (22) in sequence, and among the valve seal ring (240), the nut gasket (241) and the nut (242), the nut (242) being closer to the valve cover (23).

\* \* \* \* \*